United States Patent [19]

Kitano et al.

[11] 3,853,210

[45] Dec. 10, 1974

[54] TRANSMISSION CONTROL SYSTEM FOR VEHICLES

[75] Inventors: Shin Kitano, Aichi Gun; Yutaka Momose, Toyota, both of Japan

[73] Assignee: Aisin Seiki Kabushiki Kaisha, Kariya, Aichi Prefecture, Japan

[22] Filed: Oct. 31, 1972

[21] Appl. No.: 302,428

[30] Foreign Application Priority Data
Nov. 16, 1971 Japan.............................. 46-91701

[52] U.S. Cl.............. 192/4 C, 192/12 C, 192/13 R
[51] Int. Cl....................... F16d 67/02, F16h 57/10
[58] Field of Search......... 192/4 C, 4 R, 13 R, 12 C

[56] References Cited
UNITED STATES PATENTS

| | | | |
|---|---|---|---|
| 3,481,435 | 12/1969 | Pearce et al. | 192/4 C |
| 3,613,844 | 10/1971 | Asano et al. | 192/4 C |
| 3,659,690 | 5/1972 | Kitano et al. | 192/4 C |
| 3,696,897 | 10/1972 | Kitano et al. | 192/4 C |

Primary Examiner—Samuel Scott
Assistant Examiner—Lance W. Chandler
Attorney, Agent, or Firm—Oblon, Fisher, Spivak, McClelland & Maier

[57] ABSTRACT

A transmission control system for a vehicle having a fluid actuated clutch means and hydraulic brake means, comprising, a source a fluid pressure, a fluid pressure conduit for delivering the fluid pressure being discharged from the pressure source to the clutch means, a fluid pressure regulating valve disposed within the fluid conduit for automatically regulating the fluid pressure within the fluid conduit, a pair of control valve disposed within the fluid conduit including a shift control valve for activating and de-activating the clutch means and an inching valve actuated for gradually decreasing the fluid pressure to the clutch means in accordance with the operation of the brake means, and a shift lever engaged with the pair of control valves for selectively operating the pair of control valves for selectively operating the clutch means.

5 Claims, 6 Drawing Figures

TRANSMISSION CONTROL SYSTEM FOR VEHICLES

BACKGROUND OF THE INVENTION

Field Of The Invention

This invention relates generally to improvements in an automatic transmission control system of a vehicle, and more particularly to a hydraulic control system for an industrial vehicle such as a forklift truck which is provided with a fluid actuated clutch means and braking system for arresting movement of the vehicle.

SUMMARY OF THE INVENTION

Accordingly, it is an object of the present invention to provide a novel and improved automatic transmission control system and which is inexpensive to construct and which exhibits an improved mode of operation.

Another object of the present invention is to provide a novel and improved automatic transmission control system which has an inching valve in common with a shift control valve.

Still another object of the present invention is to provide a novel and improved automatic transmission control system which is capable of increasing the speed in which the steps of shifting control of the vehicle, besides the forward-and reverse steps, may be accomplished by means of a parallel arrangement of similar shaped valves.

BRIEF DESCRIPTION OF THE DRAWINGS

Various other objects, features and attendant advantages of this invention will be more fully appreciated as the same becomes better understood from the following detailed description when considered in connection with the accompanying drawings, in which like reference characters designate like or corresponding parts throughout the several views and wherein.

DETAILED DESCRIPTION OF THE INVENTION

Figure 1:
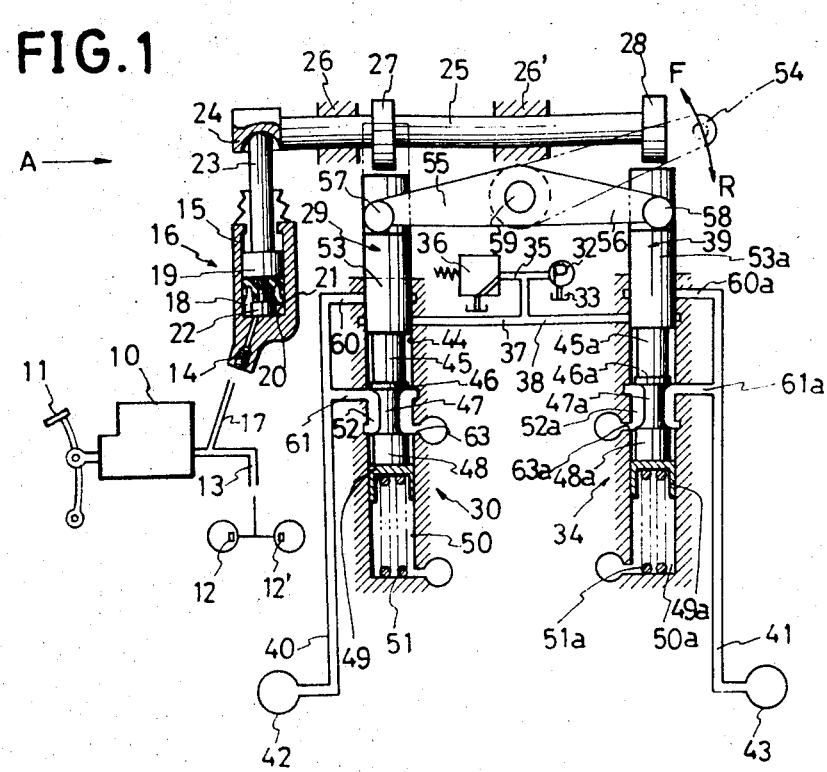
FIG. 1 is a diagrammatic view, with parts in vertical crosssection, of one embodiment of the fluid control system constructed according to the present invention.
Figure 2:
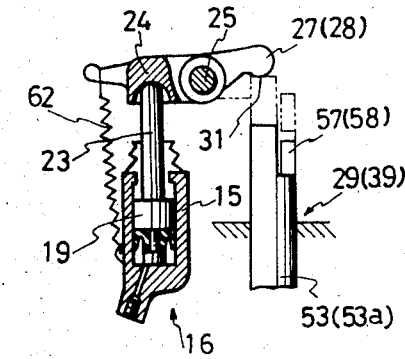
FIG. 2 is a vertical sectional view through the inching actuator of the present invention, looking in the direction of arrow A of FIG. 1.

Referring now to the drawings, and more particularly to FIG. 1 thereof, a master cylinder 10 generates brake fluid as a result of the vehicle operator depressing a brake pedal 11. The master cylinder 10 is fluidically connected with, wheel cylinders 12 and 12' by means of a conduit 13, and with a port 14 disposed within a housing 15 of an inching actuator, generally indicated by the reference character 16 by means of a conduit 17. The port 14 is in turn fluidically connected with a lower chamber 18 defined by a piston 19, which is axially vertically slidably fitted within a cylinder 20 which is formed within the housing 15, and the lower end face of the housing 15. A cup 21 is interposed between the piston 19 and a small land member 22 which is secured to the lower face of piston 19. Similarly, a vertically extending actuating rod 23 is formed integrally with the upper face of piston 19 and the upper end of the rod 23 is connected with a rocker arm 24 which is mounted upon an end portion of an axle 25 as viewed in FIG. 2. The axle 25 is rotatably disposed within supporting members 26 and 26', and has a pair of cams 27 and 28 formed thereon. The cam 27 is long enough so as to be capable of actuating a vertically movable spool, generally indicated by the reference character 29 of an inching valve, generally indicated by the reference character 30 by means of a cam face 31, from the dot-and-dash line state to the solid line position as seen in FIG. 2, arm 24 rotating about the axis of axle 25 in a clockwise direction. The arm 24 is rotatable by the upper face of the rod 23 of the inching actuator 16 when the rod 23 is moved upwardly as viewed in FIG. 1, and has a biasing return spring 62 associated therewith. Cam 28 is similar to cam 27.

A pump 32 pumps hydraulic fluid from a tank 33 to the inching valve 30 and another inching valve, generally indicated by the reference character 34 by means of a conduit 35 having associated therewith a well-known relief valve 36, and a pair of conduits 37 and 38. The inching valves 30 and 34 are in their neutral positions as seen in FIG. 1 whereby the fluid pressure transmitted from the pump 32 is cut off by the outer surfaces of the spool 29 and another spool, generally indicated by the reference character 39. Conduits 40 and 41 respectively connect the fluid pressure with a reverse clutch 42 and a forward clutch 43.

As the inching valves 30 and 34 are quite similar in construction, only the structure of inching valve 30 will be described in detail, the suffix sign *a* being attached to denote the similar components of inching valve 34. The spool 29 is slidably interposed within a cylinder 44 and is provided with serially connected cylindrical land members 45, 46, 47 and 48. Another cylindrical land member 49 of the spool 29 is slidably inserted within the cylinder 44 below land 48, whereby a chamber 50 is defined by the land 49 and the lower end wall of the cylinder 44, a spring 51 being disposed within the chamber 50 wherein one end of the spring 51 is in contact with the land 49 while the other end thereof is in contact with the end wall of the cylinder 44. The chamber 50 is fluidically connected with the tank 33 and also a chamber 52, formed between an upper land member 53 and the land 49 is fluidically connected therewith. A shift control lever 54 has associated therewith a pair of laterally extending arms 55 and 56 which have heads 57 and 58 for contacting head portions of the spools 29 and 39 against the biasing forces of the springs 51 and 51a, respectively. The shift control lever 54 is rotatably mounted around a central pivotal shaft 59. Conduits 60 and 61 connect chamber 52 with conduit 40, while a drain port 63 is also provided for fluidic connection with chamber 52, all of the drain ports in this transmission control system always being connected to the tank 33.

The operation of the invention shown and described heretofore is as follows:

When in the neutral position, the fluid flowing from the pump 32 is blocked by the lands 53 and 53a of the inching valves 30 and 34, so that the reverse and forward clutches 42 and 43 are in their non-operating states. From this non-operating state of the forward and reverse clutches, when the shift control lever 54 is actuated so as to be rotated around the pivotal shaft 59 in the clockwise direction generally indicated by the arrow R in FIG. 1, the land 53a of the inching valve 34 is moved downwardly against the biasing force of the spring 51a by means of the head portion 58 of the arm 56 while the head portion 57 of the arm 55 is moved away from the land 53 of the inching valve 30 whereupon the land 53 is permitted to move upwardly, under the influence of the spring 51, and into the dot-and-dash line position shown in FIG. 1. Consequently, the fluid connection between the pump 32 and the forward clutch 43 is still blocked by the outer peripheral surface of the land 53a, while the conduits 37 and 40 are fluidically connected whereby the fluid, discharged from the pump 32 and regulated by the relief valve 36, is supplied to the reverse clutch 42 by means of the conduit 37, the chamber 52 and the conduit 40, so that the reverse clutch 42 is engaged by the operation of the well-known mechanism whereupon, the reverse movement of the vehicle is attained.

Conversely, from the non-operating state of the forward and reverse clutches, when the shift control lever 54 is actuated so as to be rotated around the pivotal shaft 59 in a counter-clockwise direction generally indicated by the arrow F in FIG. 1, the land 53 of the inching valve 30 is moved downwardly against the biasing force of the spring 51 by means of the head portion 57 of the arm 55 while the head portion 58 of the arm 56 is moved away from the land 53a of the inching valve 34 whereupon the land 53a is permitted to move upwardly under the influence of the spring 51a. As a result, the fluid communication between the pump 32 and the reverse clutch 42 is still blocked by the outer peripheral surface of the land 53 while the conduits 38 and 41 are fluidically connected whereby the fluid, discharged from the pump 32 an regulated by the relief valve 36, is supplied to the forward clutch 43 by means of the conduit 38, the chamber 52a and the conduit 41, so that the forward clutch 43 is engaged by the operation of the well-known mechanism whereupon the forward movement of the vehicle is attained.

Thus, when the vehicle, which is running in a state wherein one of the clutches 42 and 43 is engaged, is stopped, namely, when the brake pedal 11 is depressed, the brake fluid pressure increased by the master cylinder 10 is simultaneously applied to the wheel cylinders 12 and 12' via the conduit 13, whereupon the brakes are applied, as well as to the lower end of the small land 22 of the inching actuator 16 by means of conduit 17, whereby the piston 19 is moved upwardly as viewed in FIG. 1. By this upward movement of the piston 19, the arm 24, connected with the rod 23, is also moved upwardly such that it is rotated around the axis of the axle 25, in the clockwise direction as viewed in FIG. 2. Consequently, the cams 27 and 28 fixed upon the axle 25 are rotated in the same direction as was the arm 24, and by this movement of the cams 27 and 28, either of the spools 29 or 39 of the inching valves 30 and 34 will be moved downwardly against the biasing force of the springs 51 and 51a.

Figure 3:
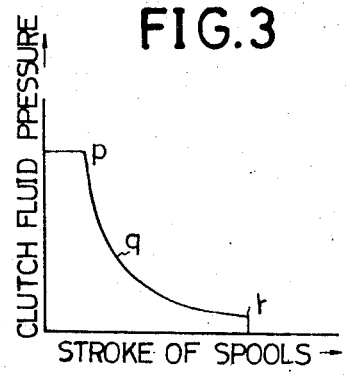
FIG. 3 is a graph diagrammatically representing the relation between the clutch fluid pressure of the inching valve and the displacement stroke of the spool valve illustrated in FIG. 1.

When, for example, the head portion of the spool 29 is moved downwardly by the rotation of the cam 27, the fluid connection between the conduits 37 and 60 is blocked by the outer peripheral surface of the land 53, while at the same time the drain port 63 is opened (it having been previously blocked or closed by land 49), wherein the clutch pressure at this stage is shown as that of point P in FIG. 3.

Subsequently, when the spool 29 is moved downwardly still further, the fluid from the pump 32, throttled by means of the orifice formed between the land 46 and cylinder 44, is transmitted to the reverse clutch 42 by means of the conduits 61 and 40, and since the axial length of the orifice, formed between the land 48 and the cylinder 44 and leading to the drain port 63 is short, the throttling of the drain port 63 becomes small and the clutch fluid pressure is variably decreased as seen by the curved line q in FIG. 3. When the spool 29 returns to the neutral position, the fluid communication between the conduits 37 and 40 is blocked by the outer peripheral surface of land 53 whereupon the fluid discharged from the pump 32 is not applied to the reverse clutch 42 and the drain port 63 is opened (it having been throttled by the orifice between land 48), wherein the resulting clutch pressure is shown as that of point R in FIG. 3. A similar operation occurs with respect to valve 34, and thus it may be seen that the valves 30 and 34 act in the dual capacities of shift control valves activating or deactivating the reverse and forward clutches 42 and 43, and inching valves which gradually decrease the fluid pressure to the clutches when the braking means are actuated.

Figure 4:
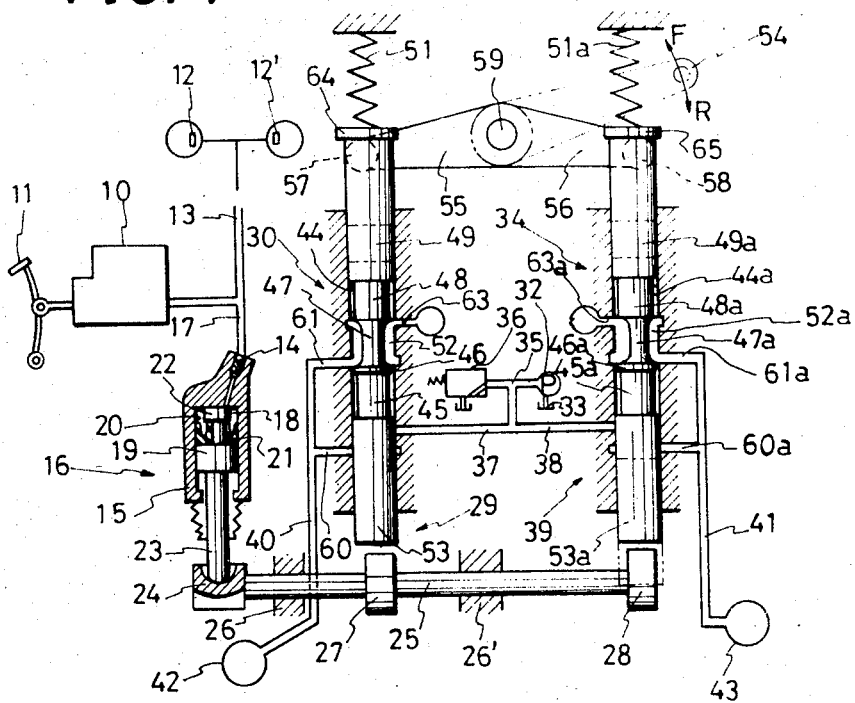
FIG. 4 is a view similar to FIG. 1, illustrating however, a second embodiment of the invention.

Referring now to FIG. 4, a second emboidment of the invention is shown, wherein the axle 25, operated by means of the inching actuator 16, and the shift control lever 54, are disposed at opposite ends of the inching valves 30 and 34. The head portions 57 and 58 mounted upon the arms 55 and 56 of the shift control lever 54 are connected with flanged portions 64 and 65 formed upon one end of the lands 49 and 49a of the inching valves 30 and 34. The inching valves 30 and 34 are biased downwardly by means of the springs 51 and 51a as seen in FIG. 4.

Figure 5:
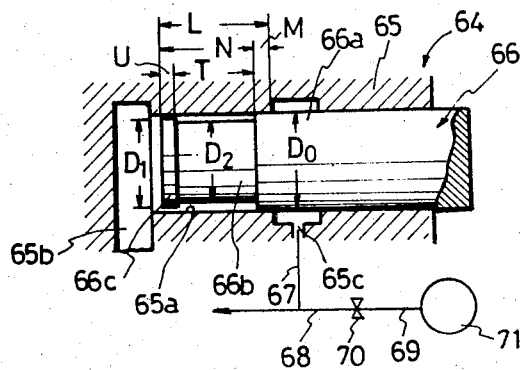
FIG. 5 is an elevational cross-sectional view of a valve similar to the inching valves shown in FIGS. 1 and 4.
Figure 6:
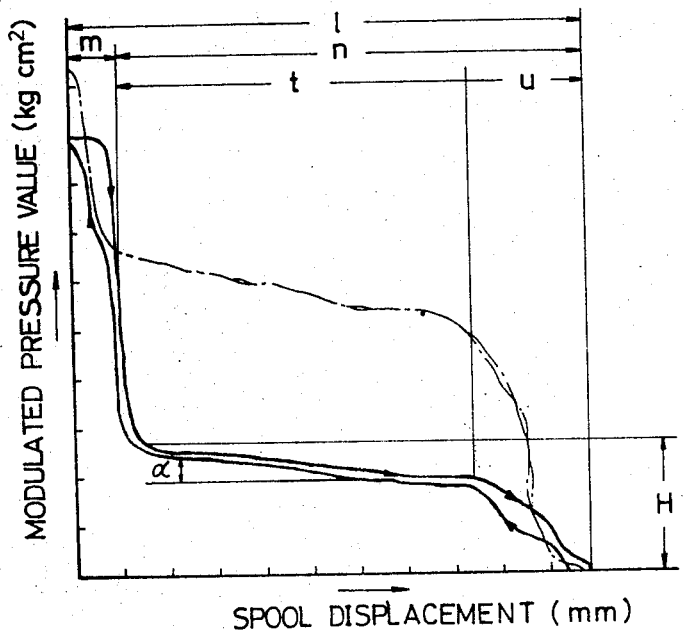
FIG. 6 is a graph showing the relation between the displacement of the valve shown in FIG. 5 and the changes in the pressure valves.

Referring now to FIGS. 5 and 6, the construction and operation of a valve generally indicated by the reference character 64, which is similar to valves 30 and 34 as shown in FIG. 1 will now be described in order to better understand valves 30 and 34. A casing 65 has a cylindrical bore 65a, which in turn, has associated therewith a drain port 65b at the left end portion thereof and an annular inlet port 65c which is disposed at a position which approximates the center of the bore 65a. The stepped spool generally indicated by the reference character 66 is slidably engaged within the bore 65a, the spool 66 being designed so as to have a large diameter portion 66a, a small diameter portion 66b adjacent portion 66a, and a medium diameter portion 66c, adjacent portion 66b, the difference between the diameters of the two portions 66a and 66c being very small. The axial length of the large diameter portion 66a is greater than that of the small diameter portion 66b and similarly, the axial length of the medium diameter portion 66c is shorter than that of the small diameter portion 66b. The inlet port 65c is connected to a conduit 67 which is in turn connected to a conduit 68.

The conduit 68 extends through an orifice 70 and is connected to a conduit 69 which is in turn connected to a fluid pressure source 71 which produces a line pressure of an approximately constant value, the conduit 68 also transmitting the line pressure to a hydraulically operated mechanism, not shown.

Fluid pressure produced by the source 71 is transmitted through the conduit 69 and is reduced in value by means of the orifice 70. The resulting fluid pressure continues to be transmitted through the conduit 68 to the hydraulically operated mechanism, and at the same time, is communicated to the inlet port 65c by means of the conduit 67. While the spool 66 is in the position illustrated in FIG. 5, however, it is noted that the fluid pressure conveyed to the inlet port 65c is blocked by the large diameter portion 66a of the spool 66.

Shown in FIG. 6 is a graph illustrating the fluid pressure value changes within the conduits 67 and 68 in accordance with the rightward displacement of the spool 66 within the valve 64 as viewed in FIG. 5. It is apparent that the fluid pressure value within the conduits 67 and 68 rapidly decreases upon completion of the connection between the inlet port 65c and the drain port 65b through the throttle passage. The reduced amount of the fluid pressure value is observed down to the value H which is determined by the ratio of the diameter $D_1$ of the medium diameter portion 66c to the diameter $D_2$ of the small diameter portion 66b and the ratio of the diameter $D_0$ of the large diameter portion 66a to the diameter $D_1$ of the medium diameter portion 66c. The spool displacement $m$ as illustrated in FIG. 6 corresponds to the axial displacement shown in FIG. 5, that is the axial distance spool portion 66a overlaps inlet port 65c, and similarly, the other displacements $l$, $n$, $t$, and $u$, shown in FIG. 6 correspond to the axial distances or dimensions L, N, T, and U shown in FIG. 5.

More specifically in accordance with the rightward displacement of the spool 66, the throttle passage between the small diameter portion 66b and the bore 65a becomes gradually smaller, thereby gradually decreasing the throttling fluid pressure. Thus, there is produced within the conduits 67 and 68 a fluid pressure which is regulated by the changes within the throttling fluid pressure. The reduced amount within the line pressure is defined by the axial length T of the small diameter portion 66b and this amount remains within the range denoted by the reference character $t$ in FIG. 6.

When the small diameter portion 66b loses its fluid pressure reducing effect by the further rightward displacement of the spool 66, only the pressure reducing effect of the medium diameter portion 66c remains. This remaining pressure throttling effect by the medium diameter portion 66c becomes gradually smaller in response to the further rightward displacement of the spool 66. Thus, the decreasing fluid pressure is controlled within a range denoted by the reference character $u$ in FIG. 6, within which range, the slope of the curve is much greater than that within the $t$ range. The degree of curvature is defined by the ratio of $D_0$ to $D_1$. It is thus apparent that the throttling effects of the valve 66 may be obtained over the entire $n$ range.

In FIG. 6, the slope of the curve within the $u$ range, and the length of the $u$ range are defined respectively by the diameter $D_1$ and the axial length U of the medium diameter portion 66c. Similarly, the slope of the curve within the $t$ range and the length of the $t$ range are defined respectively by the diameter $D_2$ and the axial length T of the small diameter portion 66b. When the diameter of the small diameter portion 66b is designed to be sufficiently small so as to disable the fluid pressure throttling effect at this particular portion, the curve within the $t$ range will have zero slope, or in other words, become a horizontal line.

Provided all the measurements of casing 65 and the spool 66 of the valve 64 are maintained unchanged, variation in the diameter of the orifice 70 can displace the fluid pressure control starting point of the valve 64. This variation in the orifice 70 will cause a vertical displacement of the curve within the $t$ range, as shown in FIG. 6, which depicts the fluid pressure changes as a result of the variation of fluid throttling effect with respect to the small diameter portion 66b. Similarly, the slope of the curve within the $u$ range of FIG. 6 is changed. The dotted curve in FIG. 6 shows the fluid pressure changes when the diameter of the orifice 70 is set larger than that of the orifice 70 with which the fluid pressure control is carried out along the solid curve of FIG. 6.

Although the ports 65c and 65b are defined respectively to be an inlet port and a drain port, reverse arrangement can provide the same system of fluid pressure control. It should also be clear that when the port 65c or 65b is connected with the pressure source 71, the port 65b or 65c being a drain port, the fluid pressure is regulated in accordance with the leftward displacement of the spool 66 in a reverse way as that control shown in FIG. 6, that is, in this case the fluid pressure changes from a low value to a high value.

Obviously, many changes and modifications of the present invention are possible in light of the above teachings. It is to be understood therefore, that within the scope of the appended claims, the invention may be practiced otherwise than as specifically described herein.

What is claimed as new and desired to be secured by Letters Patent of the United States is:

1. A control apparatus for a vehicle having a transmission with a fluid actuated clutch means and hydraulic brake means, comprising:

a source of fluid pressure;

a fluid conduit connecting said pressure source with said clutch means;

a fluid pressure relief valve disposed within said fluid conduit for automatically controlling said fluid pressure being discharged from said pressure source and for delivering a controlled fluid pressure to said clutch means;

a control valve assembly disposed within said conduit and including a housing provided with a pair of cylindrical bores located parallel to each other and having ports communicating with said conduit, a pair of valve means axially slidably engaged within said bores respectively for controlling said fluid pressure to said clutch means, and spring means for biasing said pair of valve means such that said ports are normally closed;

a shift lever engaged with said pair of valve means for selectively operating said pair of valve means; and means for selectively operating said pair of valve means in accordance with the operation of said brake means, whereby said clutch means is controlled by said pair of valve means in accordance with the selected operation of said shift lever and said clutch means is returned to its neutral position in accordance with the operation of said brake means.

2. A control apparatus as set forth in claim 1, wherein said fluid actuated clutch means comprises a forward and a reverse fluid actuated clutch means.

3. A control apparatus as set forth in claim 1, wherein said pair of valve means comprises a shift control valve and an inching valve, said shift control valve activating and de-activating said clutch means and said inching valve gradually decreasing said fluid pressure to said clutch means in accordance with the operation of said brake means.

4. A control apparatus as set forth in claim 3, said inching valves comprising a large diameter portion, a small diameter portion and a medium diameter portion, the difference between the diameters of said large diameter portion and said medium diameter portion being small, and wherein the axial length of said large diameter portion is greater than that of said small diameter portion and the axial length of said medium diameter portion is shorter than that of said small diameter portion.

5. A control apparatus as set forth in claim 1, said means for selectively operating said pair of valve means comprising an axle means having a pair of cams and an actuator connected with said axle means for actuating said cams in response to the operation of said brake means.

* * * * *